United States Patent
Cormier et al.

(10) Patent No.: US 8,682,340 B2
(45) Date of Patent: Mar. 25, 2014

(54) DATA RETRIEVAL METHOD FOR LOCATION BASED SERVICES ON A WIRELESS DEVICE

(75) Inventors: Jean-Philippe Cormier, Ottawa (CA); Trevor Plestid, Ottawa (CA)

(73) Assignee: BlackBerry Limited, Waterloo (CA)

( * ) Notice: Subject to any disclaimer, the term of this patent is extended or adjusted under 35 U.S.C. 154(b) by 1157 days.

(21) Appl. No.: 11/538,958

(22) Filed: Oct. 5, 2006

(65) Prior Publication Data

US 2008/0085724 A1 Apr. 10, 2008

(51) Int. Cl.
*H04W 24/00* (2009.01)
*H04M 1/00* (2006.01)
*B60Q 1/00* (2006.01)
*H04B 1/66* (2006.01)

(52) U.S. Cl.
USPC .................. 455/456.1; 455/550.1; 340/425.5; 701/410; 701/411; 375/240

(58) Field of Classification Search
USPC .......................................... 455/456.2, 456.1
See application file for complete search history.

(56) References Cited

U.S. PATENT DOCUMENTS

| | | | |
|---|---|---|---|
| 2002/0169778 A1* | 11/2002 | Natesan et al. ................. | 707/10 |
| 2003/0060973 A1 | 3/2003 | Mathews | |
| 2003/0081671 A1* | 5/2003 | Ishida et al. .................. | 375/240 |
| 2003/0179134 A1* | 9/2003 | Lampert et al. ........... | 342/357.14 |
| 2004/0203998 A1* | 10/2004 | Knauerhase et al. ....... | 455/550.1 |
| 2005/0033511 A1* | 2/2005 | Pechatnikov et al. ......... | 701/210 |
| 2005/0203892 A1* | 9/2005 | Wesley et al. ...................... | 707/3 |
| 2006/0080032 A1 | 4/2006 | Cooper | |
| 2007/0139168 A1* | 6/2007 | Rennie et al. ............... | 340/425.5 |

FOREIGN PATENT DOCUMENTS

| | | |
|---|---|---|
| EP | 1251335 | 10/2002 |
| EP | 1549096 | 6/2005 |

OTHER PUBLICATIONS

European Search Report dated Mar. 15, 2007 issued in connection with Euroopean Patent Application No. EP 06121853.3.
European Examination Report issued by the European Patent Office dated Feb. 2, 2009 for corresponding European Patent Application No. 06121853.3.

* cited by examiner

*Primary Examiner* — Timothy Pham
(74) *Attorney, Agent, or Firm* — Gowling Lafleur Henderson LLP

(57) ABSTRACT

An embodiment provides a method for communicating location-based information between an application server and a mobile device in response to an information query, the mobile device and the application server communicating via a communication network, the method comprising the steps of: initially transmitting a subset of the location-based information to the mobile device in response to the information query; transmitting further subsets of the location-based information as required; and pre-caching a predefined amount of location-based information at the device in response to a pre-cache trigger notification, the pre-cache trigger notification being generated when it is determined that the mobile device may lose contact with the communication network.

11 Claims, 6 Drawing Sheets

DATA RETRIEVAL METHOD FOR LOCATION BASED SERVICES ON A WIRELESS DEVICE

The following relates generally to mobile devices, and more particularly to an improved method for updating location-based information on the mobile devices.

BACKGROUND

Mobile communication devices have become popular for business and personal use due to a relatively recent increase in number of services and features that the devices and mobile infrastructures support. Handheld mobile communication devices, sometimes referred to as mobile devices, are essentially portable computers having wireless capability, and come in various forms. Examples of mobile devices include Personal Digital Assistants (PDAs), cellular phones and smart phones.

More recently, global positioning system (GPS) receivers have been integrated within such mobile devices for providing enhanced location-based services. Alternatively, mobile devices may interface with external GPS receivers via a wired interface, such as Universal Serial Bus (USB), or a wireless interface, such as Bluetooth®. In operation, a location-based application executing on the mobile device can use data obtained from a GPS receiver to provide a user with location data. This information can be used in conjunction with an application on the mobile device to provide the user with real-time location-based information.

In other implementations, the location-based application can use the data obtained from the GPS receiver as well as other data to send a request to an application server for desired information. If the mobile device is location aware, the request includes the current location of the device. The application server extracts content from a Geographic Information System (GIS) database and provides an appropriate response to the mobile device.

Accordingly, the application server can use real-time location-based information to provide a number of competitive advantages that come from accessing location information in real time. For example, mapping-applications can be used to provide the user with real-time mapping information. As another example, data can be pushed to the user in accordance with the user's determined geographic location.

Location-based applications can be generally divided into two categories: device-based location applications and server-based location applications.

Device-based location applications refer to applications run on GPS-equipped mobile devices. The device queries its current location via the GPS receiver and the application uses the device's current location information for providing service using GIS software installed on the device.

Server-based location applications refer to applications run on mobile devices that may or many not be GPS-equipped. Rather, a network server maintains a location of the mobile devices. This can be achieved by the mobile device obtaining its coordinates and transmitting them to the network server. Alternatively, the network server can obtain the location of the mobile device directly, using a number of known techniques. One such technique is known as assisted-GPS. In assisted-GPS, signalling information from a position determining entity is provided to the mobile device to aid in position determination. As long as the mobile device can connect with the network server, it can query its location from the network server rather than from the GPS receiver.

For location-based applications that interact with an application server for obtaining information, it may be impractical to retrieve all of the requested information at one time and pre-cache it on the mobile device. For example, consider an location-based application that offers travel directions. If a user is travelling from an address in New York City to an address in San Francisco, the number of instructions comprising the directions would be substantial. Specifically, it is likely that direction would include several hundred turns at specific intersections. Further, for each turn, three alternate turns are provided in case the original turn is missed. Further, supplemental information, such as names of businesses, cities, regions, lakes, rivers and other geographic landmarks along the route is also provided. As will be appreciated the amount of data required for a given trip may require a substantial amount of bandwidth and storage space on the mobile device.

Accordingly, one solution to this problem is for the mobile device to retrieve data as the user is travelling. However, such a solution requires a constant connection to a communication network so that the mobile device is able to communicate with the application server. Unfortunately, it is likely that the mobile device will be out of coverage at several points during travel, which would result in a loss of connection to the communication network. As a result, the location-based application may not be able to properly direct the user, who may miss a turn and get lost. This problem can be generalized to any location-based application that relies on a data streaming connection to the mobile device.

Therefore, it can be seen that there is a need for an improved method for retrieving data to a mobile device for use with location-based services that overcomes the above-described problems.

BRIEF DESCRIPTION OF THE DRAWINGS

Embodiments of the invention will now be described by way of example only with reference to the following drawings in which.

DETAILED DESCRIPTION OF THE PREFERRED EMBODIMENTS

Figure 1:
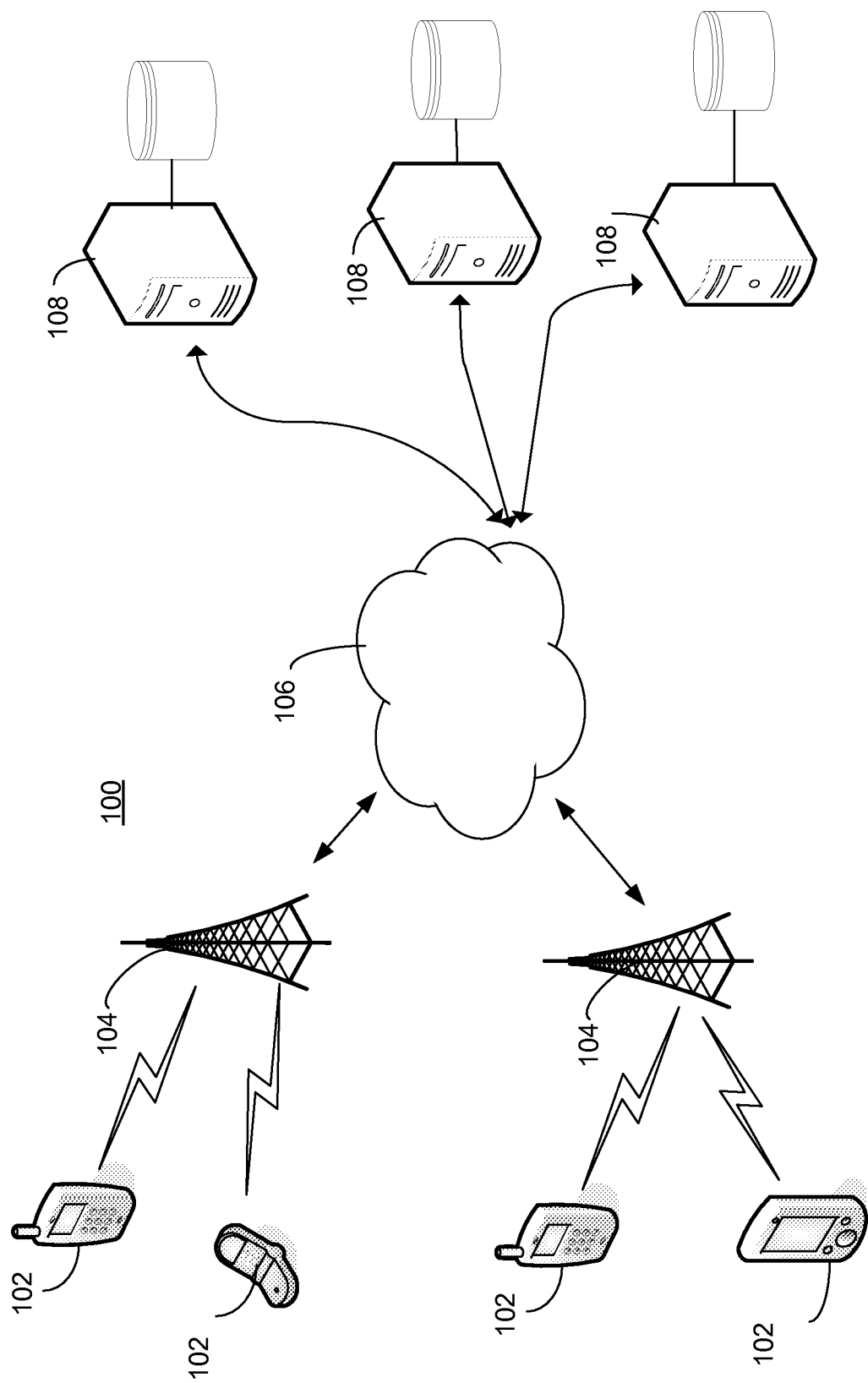
FIG. 1 is a block diagram illustrating a telecommunication infrastructure (prior art)

In accordance with one embodiment, there is provided a method for communicating location-based information between an application server and a mobile device in response to an information query, the mobile device and the application server communicating via a communication network, the method comprising the steps of: initially transmitting a subset of the location-based information to the mobile device in response to the information query; transmitting further subsets of the location-based information as required; and pre-caching a predefined amount of location-based information at the device in response to a pre-cache trigger notification, the pre-cache trigger notification being generated when it is determined that the mobile device may lose contact with the communication network.

In accordance with another embodiment, there is provided a mobile device for providing a user with access to a location-based application, the mobile device comprising: a communication subsystem configured to: transmit an information query to an application server via a communication network; receive an initial a subset of the location-based information in response to the information query; receive further subsets of the location-based information as required; and memory configured to pre-cache a predefined amount of location-based information at the device in response to a pre-cache trigger notification, the pre-cache trigger notification being generated when it is determined that the mobile device may lose contact with the communication network.

In accordance with another embodiment, there is provided a computer readable medium comprising instructions which, when executed by a mobile device in communication with an application server via a communication network, causes the mobile device to implement the steps of: transmitting a query for location-based information to the application server; initially receiving a subset of the location-based information in response to the information query; requesting further subsets of the location-based information as required; and pre-caching a predefined amount of location-based information in response to a pre-cache trigger notification, the pre-cache trigger notification being generated when it is determined that the mobile device may lose contact with the communication network.

In accordance with another embodiment, there is provided a computer readable medium comprising instructions which, when executed by an application server in communication with a mobile device via a communication network, causes the application server to implement the steps of: receiving a query for location-based information from the mobile device; initially transmitting a subset of the location-based information in response to the information query; transmitting further subsets of the location-based information as required; and transmitting a predefined amount of location-based information to be pre-cached on the mobile device in response to a pre-cache trigger notification, the pre-cache trigger notification being generated when it is determined that the mobile device may lose contact with the communication network.

In accordance with another embodiment, there is provided a method for communicating location-based information between an application server and a mobile device in response to an information query, the mobile device and the application server communicating via a communication network, the method comprising the steps of: initially transmitting critical location-based information and a subset of supplemental location-based information to the mobile device in response to the information query; and transmitting further subsets of the supplemental location-based information as required.

For convenience, like numerals in the description refer to like structures in the drawings. Referring to FIG. 1, a typical telecommunication infrastructure is illustrated generally by numeral 100. The telecommunication infrastructure 100 includes a plurality of mobile devices 102, a plurality of base stations 104, a communication network 106 and a plurality of network servers 108.

The mobile devices 102 include wireless computing devices such as a smart phone, a personal digital assistant (PDA), and the like. The mobile devices 102 are in communication with one of the base stations 104. The base stations 104 relay data between the mobile devices 102 and the network servers 108 via the communication network 106. Accordingly, the communication network 106 may include several components such as a wireless network, a relay, a corporate server and/or a mobile data server for relaying data between the base stations 104 and the network servers 108.

The network servers 108 include servers such as a Web server, an application server, and an application server with web services. It will be appreciated by a person of ordinary skill in the art that the telecommunication infrastructure 100 described herein is exemplary and that changes may be made to one or more components to accommodate different network configurations without affecting the scope of the invention described and claimed herein.

Figure 2:
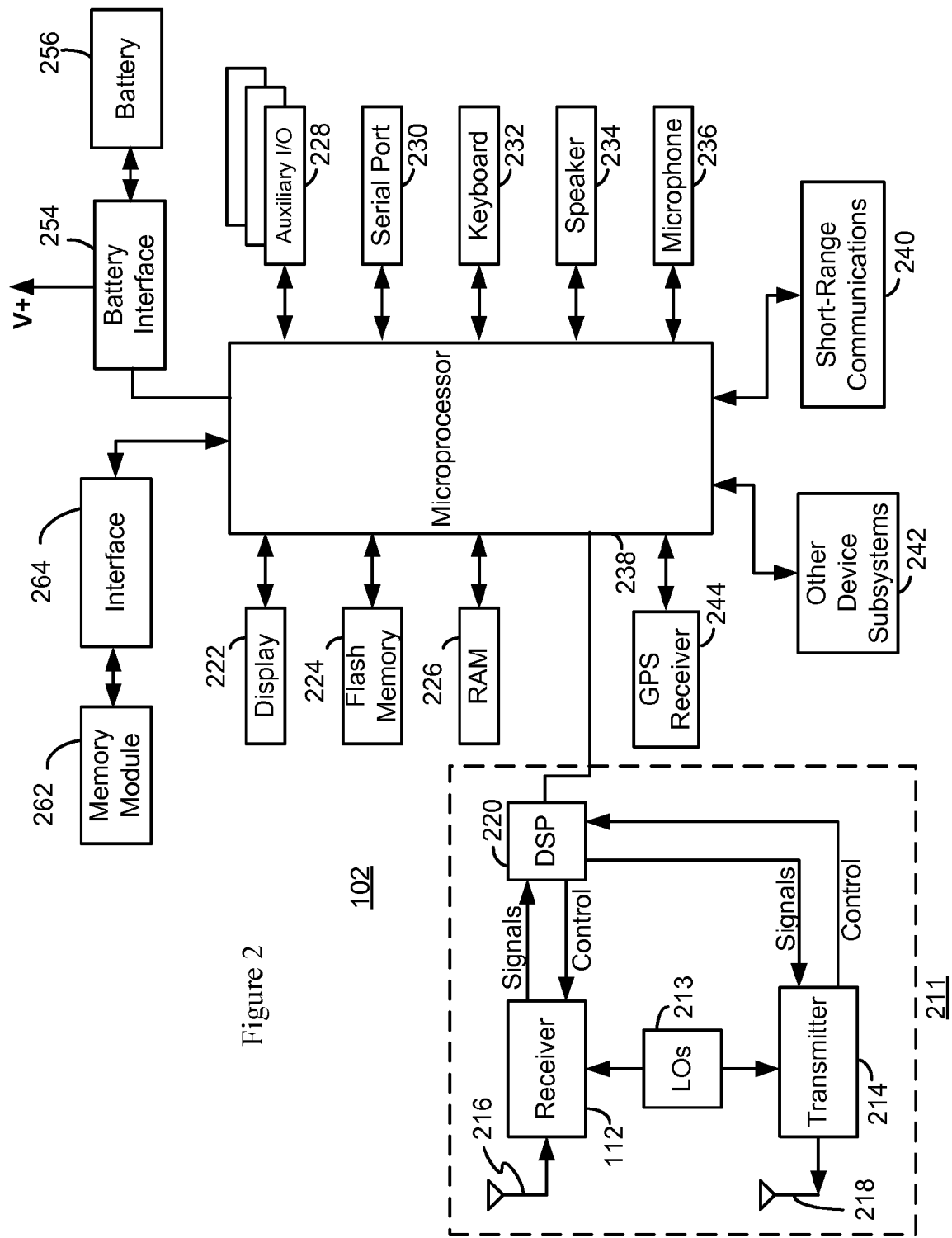
FIG. 2 is a block diagram illustrating components of a mobile device.

Referring to FIG. 2, a mobile device 102 is illustrated in greater detail. The mobile device 102 is often a two-way communication device having both voice and data communication capabilities, including the capability to communicate with other computer systems. Depending on the functionality provided by the device mobile 102, it may be referred to as a data messaging device, a two-way pager, a cellular telephone with data messaging capabilities, a wireless Internet appliance, or a data communication device.

The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which mobile device 102 is intended to operate.

The mobile device 102 includes a microprocessor 238 which controls general operation of the mobile device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. Optionally, the mobile device 102 includes a positioning device 244, such as a GPS receiver, for receiving positioning information.

Operating system software used by the microprocessor 238 is preferably stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, preferably enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106, an auxiliary I/O subsystem 228, serial port 230, short-range communications subsystem 240, or any other suitable subsystem 242, and installed by a user in RAM 226, or preferably the persistent store 224, for execution by the microprocessor 238. Such flexibility in application installation increases the functionality of the mobile device 102 and may provide enhanced on-device features, communication-related features, or both.

The display 222 is used to visually present an application's graphical user interface (GUI) to the user. The user can manipulate application data by modifying information on the GUI using an input device such as the keyboard 232 for example. Depending on the type of mobile device 102, the user may have access to other types of input devices, such as, for example, a scroll wheel, light pen or touch sensitive screen.

Location-based applications executing on the mobile device 102 use positioning information from the positioning device 244 to provide relevant information to the user, often in real-time. The positioning device 244 may be a GPS receiver for receiving satellite broadcasts. In one embodiment, the satellite broadcast data is used by the mobile device 102 to determine its position. In another embodiment, the satellite broadcast data is transmitted from the mobile device to one of the network servers 108 to determine the position of the mobile device.

Alternatively, the positioning device 244 may comprise a positioning module for receiving positioning information from one of the network servers 108. In this embodiment, the positioning module may comprise a software, rather than a hardware, solution.

Further, the mobile device 102 is provisioned with intelligent pre-caching software for managing pre-caching of data from the network server 108. It will be appreciated that the intelligent pre-caching software may form part of a location-based application. Alternatively, the intelligent pre-caching software may be a service provided by a runtime of the wireless device 102.

In the present embodiment, a network server 108 hosting the location-based service determines location-based information in response to a query from the location-based application. Continuing the previous example of a mapping application executing on the device, the query may be for routing information. In addition to the route, the network server 108 determines critical waypoints and virtual waypoints along the determined route. Critical waypoints, as used herein, relate to areas along the route that are known, a priori, to have poor radio frequency (RF) reception, given a particular carrier and/or network-type for the mobile device 102. Conversely, virtual waypoints, as used herein, relate to points along the route that are known, a priori, to have good RF reception. In the present embodiment, virtual waypoints near or adjacent to critical waypoints are determined by the network server 108.

Figure 3:
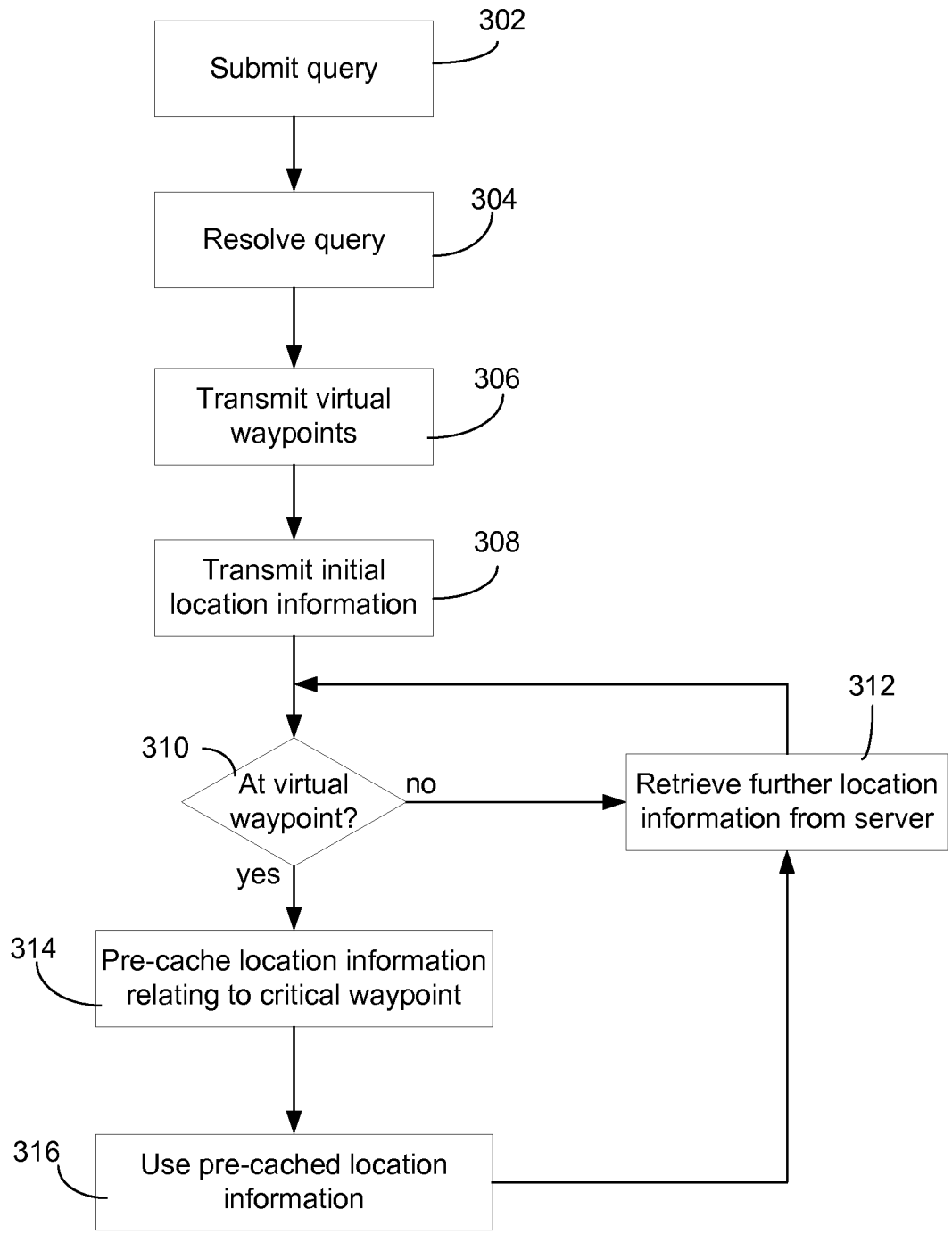
FIG. 3 is a flow chart illustrating a method for retrieving location-based information in accordance with one embodiment.

Referring to FIG. 3, a method for retrieving location-based information in accordance with the present embodiment is illustrated generally by numeral 300. At step 302 a user submits a query to the location-based application executing on the mobile device 102. Continuing the previous example, the query may be for routing information to direct the user from New York to San Francisco. The location-based application submits the query to the network server 108 hosting a corresponding location-based service.

At step 304, the network server 108 resolves the query and determines the critical and virtual waypoints along the route. At step 306, the virtual waypoints are transmitted to the intelligent pre-caching software. At step 308, which may occur simultaneously with step 306, initial information in response to the query is transmitted to the location-based application.

The intelligent pre-caching software is in communication with the positioning device 244 to determine the location of the wireless device 102. Accordingly, at step 310, the intelligent pre-caching software determines whether or not the mobile device 102 as at a virtual waypoint. If the mobile device 102 is not at virtual waypoint, the method continues to step 312. At step 312, when the location-based application requires further data it submits a query to the network server 108. Step 310 and 312 repeat until no further information is required or a virtual waypoint is reached.

If it is determined at step 310 that the mobile device 102 is at virtual waypoint, the method continues at step 314. A step 314, the intelligent pre-caching software queries the network server 108 for information relating to a nearby or adjacent critical waypoint. The information is received by the intelligent pre-caching software and stored on the mobile device 102 in either the flash memory 224 or the RAM 226.

At step 316, the intelligent pre-caching software communicates with the location-based application for providing routing information. If the mobile device 102 is using assisted GPS to determine its position, it switches to pure GPS operation, if possible, when it cannot communicate with the base station 104 due to poor RF coverage.

The location-based application continues to the use the intelligent pre-caching software as its source for information until required information is not available. At that point, the method continues at step 312 and the location-based application submits a query to the network server 108 for further information. Since the information retrieved by the intelligent pre-caching software is sufficient to cover the critical waypoint, it is likely that the mobile device 102 will have access to the communication network 106 when the method reaches step 312.

Accordingly, it will be appreciated that location information is pre-cached on the wireless device in response to a pre-cache trigger. Specifically, in the present embodiment, the pre-cache trigger occurs when the mobile device 102 reaches a predefined virtual waypoint. Further, in the present embodiment, the information that is pre-cached in response to the pre-cache trigger is sufficient to describe a predefined critical waypoint.

In accordance with an alternate embodiment, the pre-cache trigger occurs when the coverage strength at the mobile device 102 falls below a predefined threshold. Therefore, unlike the previous embodiment which relied on a pre-cache trigger determined a priori by a network server 108, the present embodiment relies on a dynamic generation of the pre-cache trigger.

Figure 4:
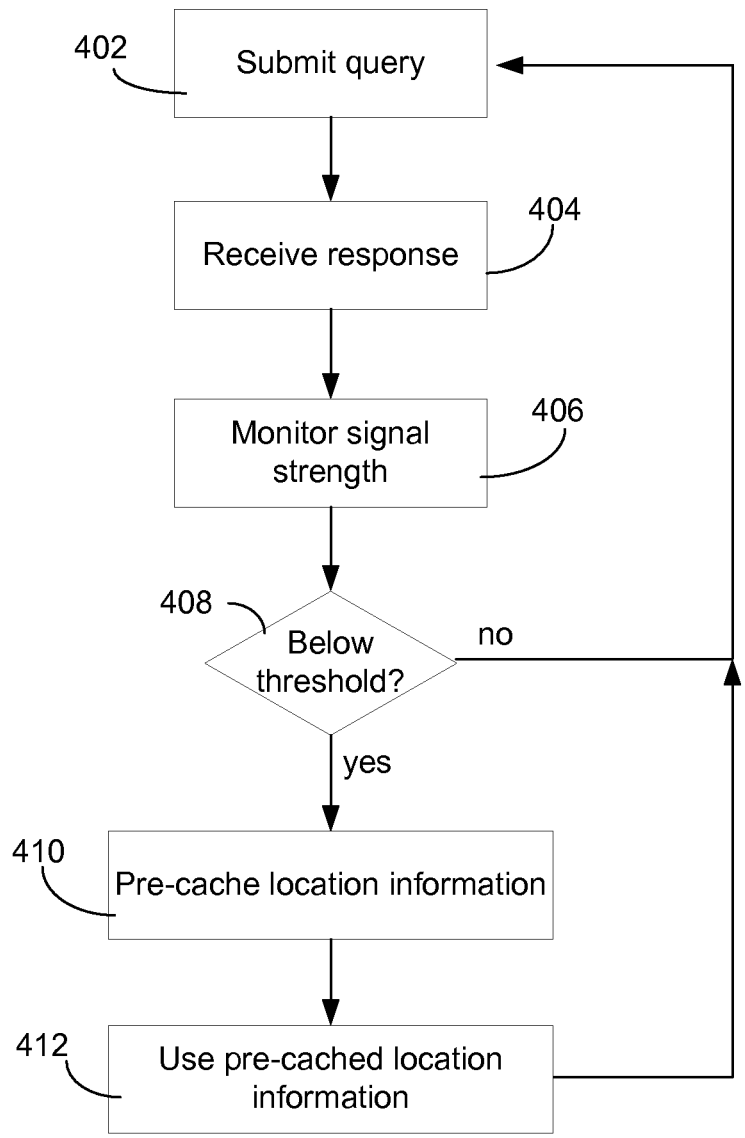
FIG. 4 is a flow chart illustrating a method for retrieving location-based information in accordance with an alternate embodiment.

Referring to FIG. 4, a method for retrieving location-based information in accordance with the present embodiment is illustrated generally by numeral 400. At step 402 a user submits a query to the location-based application executing on the mobile device 102. The location-based application submits the query to the network server 108 hosting a corresponding location-based service. At step 404, initial response information corresponding to the query is received by the location-based application.

At step 406, the intelligent pre-caching software monitors the strength of a signal between the mobile device 102 and a corresponding base station 104. It is well known in the art that the signal strength correlates with the ability of the mobile device 102 to communicate with the communication network 106. Further, many, if not all, mobile devices 102 already include an operating system that can determine the signal strength and provide a signal strength indicator on the display 222, accordingly. In the present example, the signal strength is determined by the communication subsystem 211. Accordingly, the intelligent pre-caching software can obtain the signal strength either directly from the communication subsystem 211 or via the signal strength indicator feature of the operating system.

At step 408, the intelligent pre-caching software determines whether or not the signal strength has fallen below a predefined threshold. The predefined threshold is a signal level that an application developer determines is a boundary between acceptable and unacceptable RF reception. Accordingly, if the signal strength is above the threshold, the method returns to step 402 and submits a query for further information.

If, however, the signal strength falls below the threshold, the method continues to step 410. At step 410, the intelligent pre-caching software requests pre-cache information from the network server 108 in anticipation that the signal level may drop further until the mobile device 102 is no longer able to communicate with the communication network 106.

The amount of information pre-cached on the mobile device can be defined a number of different ways. For example, the network server 108 can estimate an amount of information required for a specific time period given the current position of the mobile device 102. Alternatively, the amount of information can be defined by size and comprises a predefined quantity of information. Other ways to determine an amount of information to pre-cache will become apparent to a person skilled in the art.

At step 412, the intelligent pre-caching software informs the location-based application that a certain amount of information has been pre-cached on the mobile device 102. Accordingly, the location-based application retrieves information from the pre-cached information rather than querying the network server 108. If the location-based application needs information not included in the pre-cached information, the operation returns to step 402 and the location-based application queries the network server 108 for further information.

In accordance with yet an alternate embodiment, the pre-cache trigger is activated by the network server 108 when it determines that the mobile device 102 is in an position that has limited RF reception. Accordingly, similar to the embodiment described with reference to FIG. 3, the network server 108 has a priori know of locations having poor reception. However, unlike the previous embodiments, in the present embodiment the network server 108 uses knowledge of the location of the mobile device 102 to push a predefined quantity of location-based information to it. Therefore, the present embodiment relies on a dynamic generation of the pre-cache trigger at the network server 108.

Figure 5:
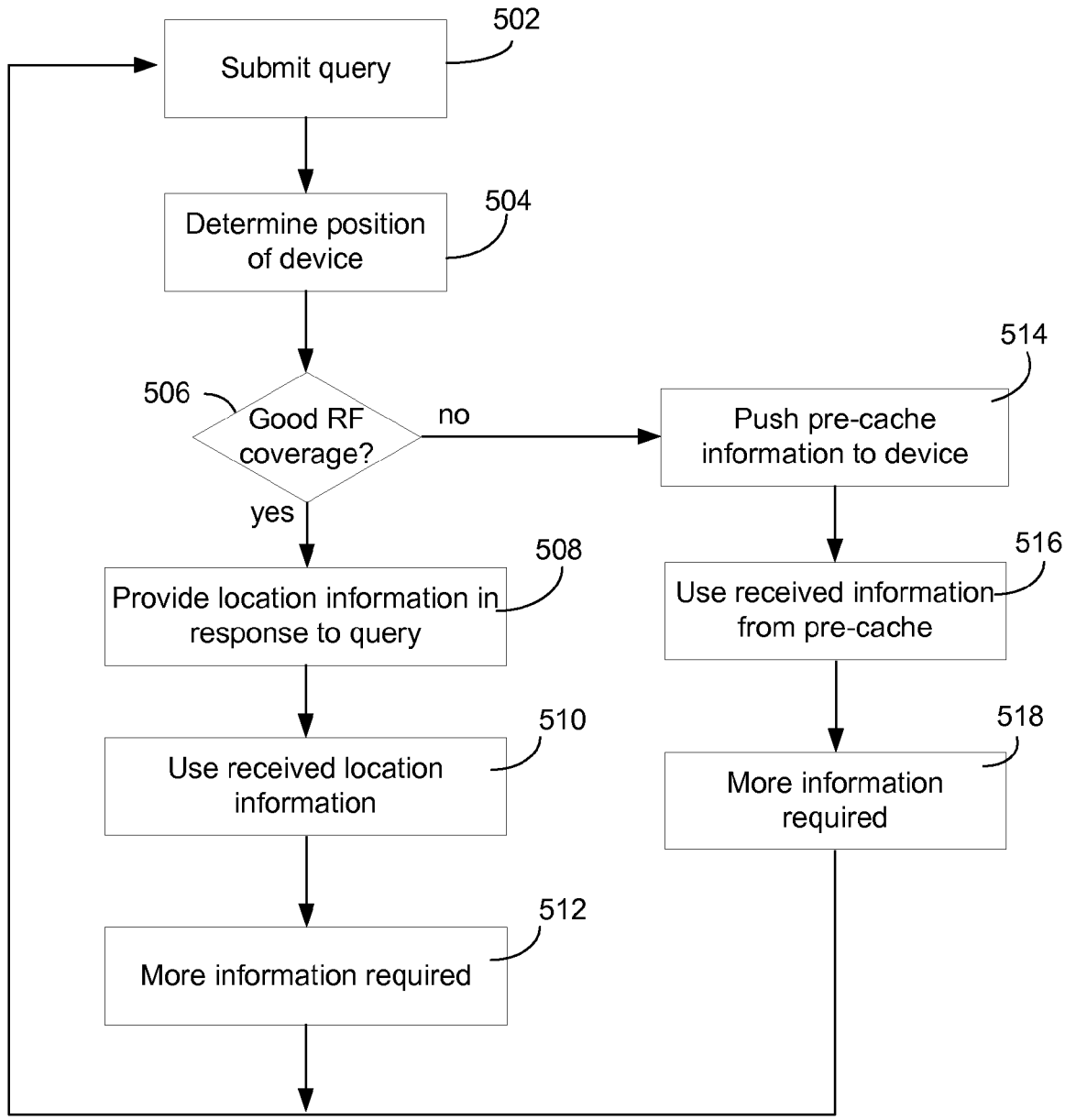
FIG. 5 is a flow chart illustrating a method for retrieving location-based information in accordance with yet an alternate embodiment.

Referring to FIG. 5, a method for retrieving location-based information in accordance with the present embodiment is illustrated generally by numeral 500. At step 502 a user submits a query to the location-based application executing on the mobile device 102. The location-based application submits the query to the network server 108 hosting a corresponding location-based service.

At step 504, the location-based service determines the position of the mobile device 102. This can be achieved a number of ways, as is standard in the art. For example, if the position is being maintained on the mobile device 102, the location-based application can include the position in its query. On the other hand, the position may be maintained at the network server 108 and the location-based service would have access to that information.

At step 506, the location-based service determines whether or not the mobile device 102 is at or near a location determined to have poor RF reception. If the mobile device 102 is at or near a location determined to have good RF reception, the method continues to step 508. At step 508, the location-based service provides information in response to the query provided by the location-based application. At step 510, the location-based application receives the response and provides location-based information to the user accordingly. At step 512, the location-based application determines that more information is required, the method returns to step 502 and a new query is submitted to the network server 108.

If at step 506, it is determined that the mobile device 102 is at or near a location determined to have poor RF coverage, the method continues to step 514. At step 514, the location-based service pushes a predefined quantity of information to the mobile device 102 to be pre-cached in the flash memory 224 or RAM 226. The amount of information that is pushed to the device can be determined a number of different ways. For example, the location-based service can estimate an amount of information required for a specific time period given the current position of the mobile device 102. Alternatively, the amount of information can be defined by size and comprised a predefined quantity of data. Alternatively, the location-based service can determine the information required to sufficiently described the area defined to have poor RF coverage. Once the information is pre-cached on the mobile device 102, the location-based application is informed.

At step 516, the location-based application retrieves pre-cached information from the memory for presenting on the mobile device 102, as required. At step 518, the location-based application determines that the pre-cached information does not have sufficient information to respond to a query, the method returns to step 502 and submits the query to the network server 108.

Accordingly, it can be seen that the present embodiment does not require intelligent pre-cache software at device, but rather at network server 108. Further, it will be appreciated that in the embodiments described above, the positioning device 244 can operate without assistance from the communication network 106 to provide accurate location information to the mobile device 102 when it is out of coverage.

In the above-described embodiments, the location-based application is informed when information is being pre-cached, so it knows when to request information from the flash memory 224 or RAM 226, rather than the network server 108. However, other implementations will be apparent to a person skilled in the art. For example, in an alternate embodiment, the location-based application is designed to first query the network server 108. In the event that the mobile device 102 is out of coverage, the location-based application queries the flash memory 224, a random access memory (RAM) 226 to determine if there is any pre-cached information. In yet an alternate embodiment, the location-based application is designed to first query the memory to determine if there is any pre-cached information. In the event that the pre-cached information does not satisfy the query, location based application attempts to contact the network server 108.

In yet an alternate embodiment, the intelligent pre-caching application initially pre-caches critical information from the network server 108. As used in this description, critical information refers to a minimal amount of information required by the location-based application. The critical information defines a critical path. It will be appreciated that what is considered to be critical information may differ from location-based application to location-based application, as well as between different implementations of the same location-based application. The mobile device 102 can then retrieve supplemental data in segments as required. It will be appreciated that supplemental information refers to information that is not critical information. Therefore, even if the mobile device 102 periodically drops its connection to the communication network 106, it can rely on the pre-cached critical information for directions. During this time, should the mobile device 102 stray from the critical path, the location-based application directs the user back to the last know critical point. For example, if the user misses a turn, the location-based application suggests a u-turn to redirect the user back a previous intersection rather than recalculate the route.

Figure 6:
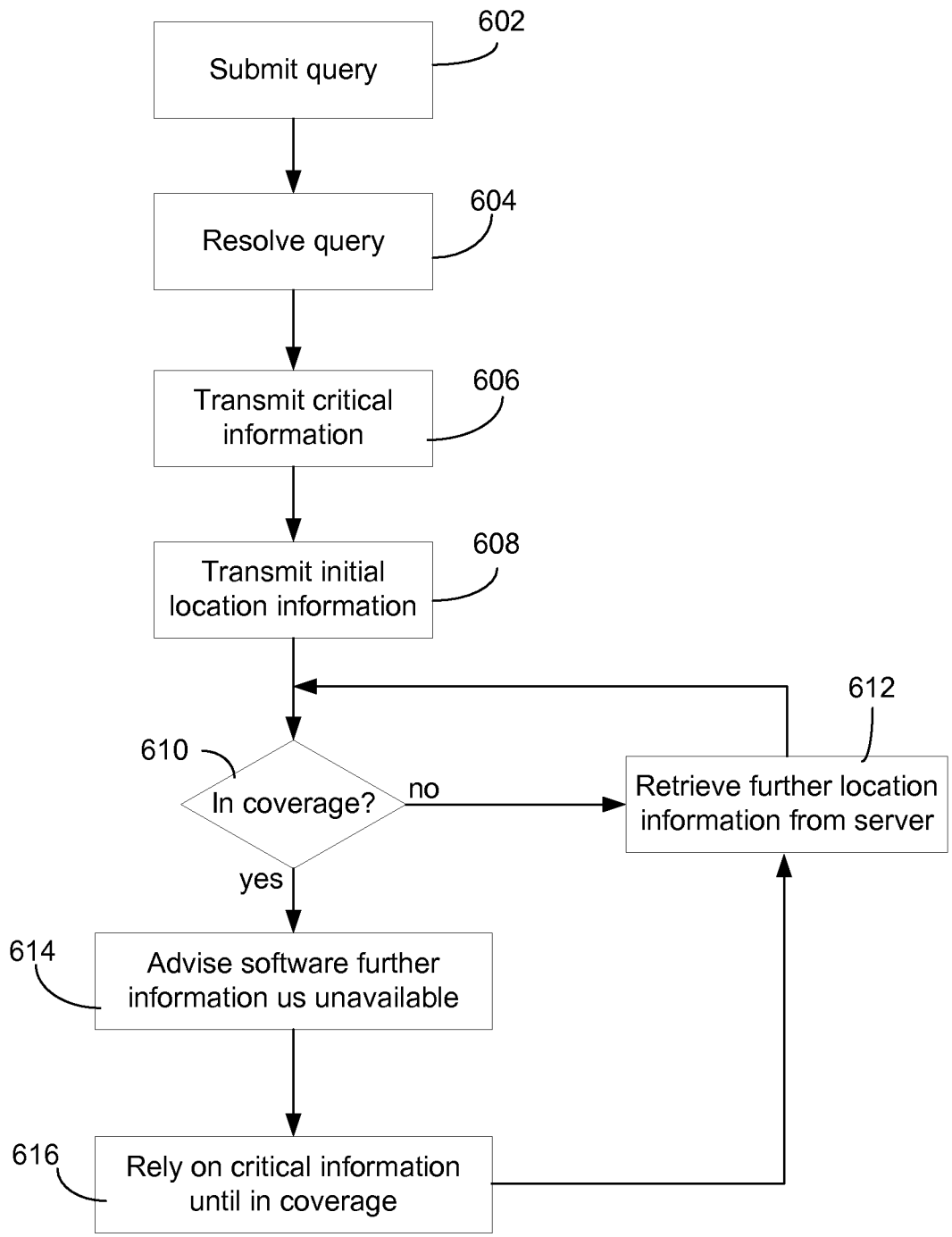
FIG. 6 is a flow chart illustrating a method for retrieving location-based information in accordance with yet an alternate embodiment.

Referring to FIG. 6, operation of the intelligent pre-caching software in accordance with the present embodiment is illustrated generally by numeral 600. In step 602, a user submits a query to the location-based application executing on the mobile device 102. Continuing the previous example, the query may be for routing information to direct the user from New York to San Francisco. The location-based application submits the query to the intelligent pre-caching software, which in turn submits the query to a corresponding one of the network servers 108 via the communication network 106.

In step 604, the network server 108 resolves the request and prepares the routing information. The routing information is separated into critical information and supplemental information, as defined by an application developer. In the present example, the critical information includes street names, turns, and intersections required to successfully navigate from New York to San Francisco without deviation. Further, in the present example, the supplemental information includes alternates turns; city, county and state names along the route; geographical information such as lakes and rivers along the route; and business information such as hotels, restaurants and gas stations along the route.

At step 606, the critical information is transmitted from the network server 108 to the intelligent pre-caching software for use by the location-based application. At step 608, a first portion of the supplemental information is transmitted from the network server 108 to the intelligent pre-caching software for use by the location-based application. The first portion of supplemental information includes a predefined amount of information. The amount of information can be defined a number of different ways. For example, the network server 108 can estimate an amount of information required for a specific time period given the current position of the mobile device. Alternatively, the amount of information can be defined by size and a the portion comprised a predefined quantity of data.

The location-based application provides the required directional information to the user until it determines that it is approaching the end of available supplemental data. At this point the location based-application requests that the intelligent pre-caching software obtain the next portion of supplemental information.

At step 610, the intelligent pre-caching software determines from the communication subsystem 211 whether or not the mobile device 102 is in coverage and, therefore, in communication with the communication network 106. If the mobile device is in coverage, the intelligent pre-caching software continues at step 612 and the next portion of supplemental information is retrieved from the network server 108. Once the data has been retrieved, it is returned to the location-based application, which returns to step 610.

If it is determined at step 610 that the mobile device 102 is not in coverage, the intelligent pre-caching software continues at step 614. At step 614, the intelligent pre-caching software informs the location-based application that it is currently unable to obtain further data. Accordingly, at step 616, the location-based application provides instructions to the user in accordance with the predefined critical path. As previously described, it the user deviates from the critical path the location-based application requests that the user return to the last identified point along the critical path. Further, in the present embodiment, the user is provided with one or more of a visual and audio warning advising that the mobile device 102 is out of coverage.

Once the mobile device 102 is in coverage again, the intelligent pre-caching software continues at step 612 and retrieves the following section of supplemental information.

Accordingly, it will be appreciated by a person skilled in the art that embodiment described above provides the capability to retrieve sufficient routing data to adequately guide the user of the mobile device 102 without requiring that all the data be obtained.

Although a number of different embodiments are described above, it will be appreciated by a person of ordinary skill in the art that various combinations of the different embodiments may also be implemented.

Further, although the invention has been described with reference to certain specific embodiments, various modifications thereof will be apparent to those skilled in the art without departing from the scope of the invention as defined by the appended claims.

The invention claimed is:

1. A method for communicating location-based information in response to a direction information query from a mobile device, the method comprising:
    wherein the location-based information is separated into critical information and supplementary information and wherein the mobile device is in communication with an application server via a communication network;
    receiving the critical information at the mobile device in response to the direction information query, the critical information defining a critical path having at least one critical waypoint;
    monitoring a signal strength for conformance with a predefined threshold level of acceptable wireless communication between the mobile device and the communication network;
    determining, while the device is communicating with the communication network, that the mobile device may lose contact with the communication network after the signal strength drops below the predefined threshold; and
    in response to the determining, receiving and caching the supplementary information at the mobile device at a virtual waypoint located geographically adjacent the at least one critical waypoint;
    wherein the critical information initially received at the mobile device comprises a minimized set of route instructions to direct a user of the mobile device to a target destination.

2. The method of claim 1, wherein a cache trigger notification is generated by the mobile device when the mobile device determines that it has reached the virtual waypoint.

3. The method of claim 1, wherein a cache trigger notification is generated by the application server when the application server determines that the mobile device has reached the virtual waypoint.

4. The method of claim 1, wherein the supplemental information is cached in response to submitting a further direction query to the application server.

5. The method of claim 1, wherein the supplemental information cached at the device comprises business information along the critical path.

6. The method of claim 1, wherein the critical information received at the device corresponds to a predefined maximum file size.

7. A mobile device for providing a user with access to a location-based application, the mobile device comprising:
a communication subsystem configured to:
transmit a direction query to an application server via a communication network;
receive a critical information subset of the location-based information in response to the information query; and
memory configured to cache a supplementary information subset of the location-based information at the mobile device when it is determined that the mobile device may lose contact with the communication network at a virtual waypoint based on monitoring a signal strength for conformance with a predefined threshold level of acceptable wireless communication between the mobile device and the communication network and determining, while the device is communicating with the communication network, that the mobile device may lose contact with the communication network after the signal strength drops below the predefined threshold, the virtual waypoint located geographically adjacent the at least one critical waypoint;
wherein the critical information initially received at the mobile device comprises a minimized set of route instructions to direct a user of the mobile device to a target destination.

8. The mobile device of claim 7 further comprising a positioning device.

9. The mobile device of claim 8 wherein the positioning device is a Global Positioning System receiver.

10. A non-transitory computer readable memory comprising instructions which, when executed by a mobile device causes the mobile device to implement:
wherein the mobile device is in communication with an application server via a communication network;
transmitting a direction information query for location-based information to the application server; the location-based information separated into critical information and supplementary information;
receiving the critical information at the mobile device in response to the direction information query, the critical information defining a critical path having at least one critical waypoint;
monitoring a signal strength for conformance with a predefined threshold level of acceptable wireless communication between the mobile device and the communication network;
determining, while the device is communicating with the communication network, that the mobile device may lose contact with the communication network after the signal strength drops below the predefined threshold; and
in response to the determining, receiving and caching the supplementary information at the mobile device at a virtual waypoint, the virtual waypoint located geographically adjacent the at least one critical waypoint;
wherein the critical information initially received at the mobile device comprises a minimized set of route instructions to direct a user of the mobile device to a target destination.

11. A non-transitory computer readable memory comprising instructions which, when executed by an application server, causes the application server to implement:
wherein the application server is in communication with a mobile device via a communication network;
receiving a query for location-based information from the mobile device, the location-based information separated into critical information and supplementary information;
transmitting the critical information to the mobile device in response to a direction information query, the critical information defining a critical path having at least one critical waypoint;
monitoring a signal strength for conformance with a predefined threshold level of acceptable wireless communication between the mobile device and the communication network;
determining, while the device is communicating with the communication network, that the mobile device may lose contact with the communication network after the signal strength drops below the predefined threshold; and
in response to the determining, transmitting the supplemental information to be cached on the mobile device at a virtual waypoint, the virtual waypoint located geographically adjacent the at least one critical waypoint;
wherein the critical information initially received at the mobile device comprises a minimized set of route instructions to direct a user of the mobile device to a target destination.

* * * * *